US008706306B2

(12) United States Patent
Bartshe et al.

(10) Patent No.: US 8,706,306 B2
(45) Date of Patent: Apr. 22, 2014

(54) SYSTEM AND METHOD OF MANAGING LINE PRESSURE IN A VEHICLE DURING A FAULT PENDING CONDITION

(75) Inventors: James R. Bartshe, Plymouth, MI (US); Syed Naqi, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 405 days.

(21) Appl. No.: 12/971,100

(22) Filed: Dec. 17, 2010

(65) Prior Publication Data

US 2012/0065785 A1 Mar. 15, 2012

Related U.S. Application Data

(60) Provisional application No. 61/382,535, filed on Sep. 14, 2010.

(51) Int. Cl.

| | |
|---|---|
| ***G05D 7/00*** | (2006.01) |
| ***G05B 11/01*** | (2006.01) |
| ***G05B 9/02*** | (2006.01) |
| ***G06F 11/30*** | (2006.01) |

(52) U.S. Cl.
USPC ............... 700/282; 700/21; 700/81; 702/114; 702/183; 702/185

(58) Field of Classification Search
None
See application file for complete search history.

(56) References Cited

U.S. PATENT DOCUMENTS

| | | | | |
|---|---|---|---|---|
| 6,910,493 | B2 * | 6/2005 | Foster et al. | 137/12 |
| 2009/0299583 | A1 * | 12/2009 | Dell' Eva | 701/51 |

FOREIGN PATENT DOCUMENTS

| | | | |
|---|---|---|---|
| DE | 10156440 | A1 | 7/2002 |
| GB | 1443682 | A | 7/1976 |

* cited by examiner

*Primary Examiner* — Sean Shechtman
(74) *Attorney, Agent, or Firm* — Quinn Law Group, PLLC

(57) ABSTRACT

An exemplary system includes a hydraulic device configured to operate at a fluid pressure. A sensor is configured to measure fluid pressure in the hydraulic device and generate a pressure signal representative of the measured fluid pressure. An actuator configured to regulate fluid flow to the hydraulic device. A control module is configured to identify a fault pending condition based on the measured fluid pressure, increase the fluid pressure in the hydraulic device during the fault pending condition, and iteratively enable and disable the actuator during the fault pending condition to determine if the actuator has failed.

8 Claims, 1 Drawing Sheet

SYSTEM AND METHOD OF MANAGING LINE PRESSURE IN A VEHICLE DURING A FAULT PENDING CONDITION

CROSS-REFERENCE TO RELATED APPLICATIONS

This application claims the benefit of U.S. Provisional Patent Application No. 61/382,535, filed Sep. 14, 2010, which is hereby incorporated by reference in its entirety.

TECHNICAL FIELD

The invention relates to a diagnostic system for a vehicle.

BACKGROUND

Passenger and commercial vehicles use various hydraulic devices such as clutch assemblies, brake assemblies, and valve bodies. A pump provides a fluid to the hydraulic device, and a flow regulator regulates fluid flow from the pump to the hydraulic device. Sensors are used to measure the fluid flow through the hydraulic device and diagnose problems with the flow regulator. Vehicle manufacturers purposely operate hydraulic devices at low fluid pressures at various times because doing so provides benefits such as increased efficiency. These low pressures, however, are often too low to be detected by the sensors. Therefore, the sensor is not always able to detect fluid flow through the hydraulic device. Without the ability to detect fluid flow, a flow regulator failure may go undetected by the sensor.

SUMMARY

A system includes a hydraulic device configured to operate at a fluid pressure. A sensor is configured to measure fluid pressure in the hydraulic device and generate a pressure signal representative of the measured fluid pressure. An actuator is configured to regulate fluid flow to the hydraulic device. A control module is configured to identify a fault pending condition based on the measured fluid pressure, increase the fluid pressure in the hydraulic device during the fault pending condition, and iteratively enable and disable the actuator during the fault pending condition to determine if the actuator has failed.

A method includes measuring a first fluid pressure in a hydraulic device, determining whether a fault pending condition exists based on the first measured fluid pressure, iteratively enabling and disabling an actuator that regulates fluid flow to the hydraulic device at least partially during the fault pending condition, measuring a second fluid pressure in the hydraulic device, and determining whether the actuator has failed based on the second measured fluid pressure.

The above features and advantages and other features and advantages of the present invention are readily apparent from the following detailed description of the best modes for carrying out the invention when taken in connection with the accompanying drawings.

DETAILED DESCRIPTION

An exemplary system that is able to diagnose otherwise undetectable component failures includes a hydraulic device configured to operate at a fluid pressure. A sensor is configured to measure fluid pressure in the hydraulic device and generate a pressure signal representative of the measured fluid pressure. An actuator is configured to regulate fluid flow to the hydraulic device. A control module is configured to identify a fault pending condition based on the measured fluid pressure, increase the fluid pressure in the hydraulic device during the fault pending condition, and iteratively enable and disable the actuator during the fault pending condition to determine if the actuator has failed. After the fault pending condition is over, the control module may reduce the fluid pressure to a lower level.

The exemplary system disclosed herein is able to diagnose failures that were previously undetectable due to limitations in the range of the sensor while significantly retaining the added benefits associated with generally operating hydraulic devices at low fluid pressures. Moreover, when used in automotive applications, this diagnostic may occur in the background without any inconvenience to the driver. That is, the driver may only become aware of the diagnostic test if a failure is discovered.

Figure 1:
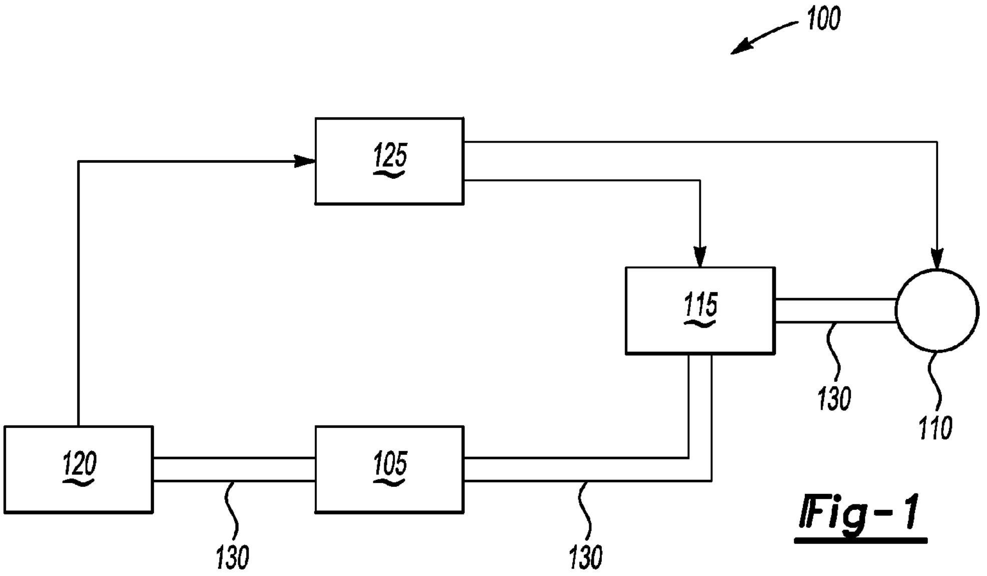
FIG. 1 is a schematic of an exemplary system configured to diagnose an actuator failure.

FIG. 1 illustrates an exemplary system that is able to diagnose previously undetectable component failures. The system may take many different forms and include multiple and/or alternate components and facilities. While an exemplary system is shown in the Figures, the exemplary components illustrated in the Figures are not intended to be limiting. Indeed, additional or alternative components and/or implementations may be used.

The system 100 includes a hydraulic device 105, a pump 110, an actuator 115, a sensor 120, and a control module 125. The system may be implemented in a vehicle, such as a passenger or commercial automobile. Further, the system may be implemented in a hybrid electric vehicle including a plug-in hybrid electric vehicle (PHEV) or an extended range electric vehicle (EREV), a gas-powered vehicle, a battery electric vehicle (BEV), or the like.

The hydraulic device 105 may include any device configured to operate when provided with a fluid pressure. In particular, the hydraulic device 105 may include one or more parts that move in response to the pressure of the fluid. For instance, the hydraulic device 105 may include a clutch assembly, a brake assembly, a valve body, etc. The hydraulic device 105 may be configured to operate at one or more fluid pressures. The range may be defined by a minimum fluid pressure and a maximum fluid pressure. If the pressure provided to the hydraulic device 105 is below the minimum fluid pressure or above the maximum fluid pressure, the hydraulic device 105 may not operate or may operate incorrectly.

The pump 110 is in fluid communication with the hydraulic device 105. That is, the pump 110 is able to provide fluid to the hydraulic device 105 using one or more fluid lines 130. The pump 110 may receive the fluid from a fluid reservoir (not shown) and provide the fluid from the reservoir to the hydraulic device 105 with the minimum fluid pressure needed to operate the hydraulic device 105. The pump 110 may provide fluid to other hydraulic devices (not shown) as well. As more devices request fluid from the pump 110, the pump 110 may increase the fluid pressure output so that each hydraulic device 105 receives the minimum fluid pressure needed to operate properly.

The actuator 115 may include any device configured to regulate fluid flow between the pump 110 and the hydraulic device 105. The actuator 115 may include a pressure control solenoid that, in response to a control signal, opens and closes. When open, the actuator 115 may allow fluid to flow from the pump 110 to the hydraulic device 105. When closed, the actuator 115 may be configured to prevent fluid from flowing from the pump 110 to the hydraulic device 105.

The sensor 120 may include any device, such as a pressure switch, configured to measure the fluid pressure in the hydraulic device 105 and output a pressure signal representative of the measured fluid pressure. The sensor 120, therefore, may be in fluid communication with the hydraulic device 105 via one or more hydraulic lines. The sensor 120 may further be configured to measure fluid pressures within a predetermined range or above a threshold level. The range of fluid pressures that the sensor 120 is able to measure may be different than the range of pressures at which the hydraulic device 105 may operate. Therefore, it is possible that the hydraulic device 105 may operate at pressures outside the range of pressures that may be detected by the sensor 120. If so, the sensor 120 may be unable to measure the fluid pressure in the hydraulic device 105 until the fluid pressure is raised beyond the threshold level.

The control module 125 is in communication with the actuator 115, pump 110, and sensor 120. The control module 125 is configured to generate an actuator control signal to control the actuator 115. In one exemplary implementation, the actuator control signal may cause the actuator 115 to open and/or close. Therefore, the control module 125 may cause the actuator 115 to allow and/or prevent fluid flow from the pump 110 to the hydraulic device 105. Additionally, the control module 125 may be configured to pulse the actuator 115. For instance, the actuator control signal may be a pulse-width-modulation (PWM) signal with a duty cycle of 50%. When the actuator control signal is high, the actuator 115 opens. When the actuator control signal is low, the actuator 115 closes. The control module 125 may be configured to pulse the actuator 115 with the actuator control signal after identifying a fault pending condition, as discussed in greater detail below. Of course, the control module 125 may be configured to pulse the actuator 115 at other times.

The control module 125 may be further configured to control the pump 110 using a pump control signal. In one exemplary approach, the pump control signal may indicate to the pump 110 the minimum fluid pressure needed by the hydraulic device 105 to operate properly. Of course, the control module 125 may consider the minimum fluid pressure required by other hydraulic devices (not shown) serviced by the same pump 110. Therefore, the pump control signal may represent the minimum fluid pressure needed to service multiple hydraulic devices 105.

As discussed above, the control module 125 may be configured to determine whether a fault pending condition exists, and if so, determine whether the actuator 115 has failed. The fault pending condition may include any situation that may be caused by a failed actuator 115. The control module 125 may determine whether the fault pending condition exists by comparing the measured fluid pressure to an expected fluid pressure. Accordingly, the control module 125 may receive the pressure signal output by the sensor 120 and derive the measured fluid pressure in the hydraulic device 105 from the pressure signal. The expected fluid pressure may be determined from the pump control signal and the actuator control signal. As previously discussed, the control module 125 determines the minimum fluid pressure needed for one or more hydraulic devices and communicates that information to the pump 110 via the pump control signal. Moreover, the control module 125 controls the operation of the actuator 115, and thus, knows when the fluid from the pump 110 is able to flow through the actuator 115 and to the hydraulic device 105. From this information, the control module 125 can predict the fluid pressure, and thus, derive the expected fluid pressure.

The control module 125 may identify the fault pending condition by comparing the measured fluid pressure to the expected fluid pressure. If the measured fluid pressure is substantially the same as the expected fluid pressure, the control module 125 may be configured to determine that no fault pending condition exists. On the other hand, if the measured fluid pressure and the expected fluid pressure are substantially different, the control module 125 may be configured to determine that the fault pending condition exists.

If the fault pending condition exists, the control module 125 may be configured to confirm that the problem is not with the sensor 120. As discussed above, the operating range of the sensor 120 may not be sufficient to measure the minimum fluid pressure needed by the hydraulic device 105 to operate properly. In this case, the measured fluid pressure may be substantially different than the expected fluid pressure through no fault of the actuator 115. To test the sensor 120, the control module 125 may be configured to request a higher fluid pressure from the pump 110 via the pump control signal. In particular, the higher fluid pressure may be a pressure within the operating range of the sensor 120.

If the measured fluid pressure is still substantially different than the expected fluid pressure after raising the fluid pressure output by the pump 110, the control module 125 may be configured to pulse the actuator 115 to determine if the actuator 115 has failed. As discussed above, the control module 125 may pulse the actuator 115 by transmitting a pulse-width-modulation signal to the actuator 115 that causes the actuator 115 to iteratively open and close. The control module 125 may pulse the actuator 115 any number of times. Indeed, the control module 125 may monitor the measured fluid pressure signal and cease pulsing the actuator 115 after a predetermined number of pulses or after the measured fluid pressure signal indicates that the pressure is changing in accordance with a predetermined number of pulses.

If the actuator 115 is working properly, the measured fluid pressure will indicate a sequence of a period of higher pressure followed by a period of lower pressure while the actuator 115 is being pulsed. However, if the actuator 115 has failed, the fluid pressure detected by the sensor 120 may stay relatively even. For instance, if the actuator 115 is stuck in the open position, the pressure through the hydraulic device 105 will remain relatively high. If the actuator 115 is stuck in the closed position, the pressure through the hydraulic device 105 will remain relatively low. Accordingly, the control module 125 may diagnose the failed actuator 115, as well as the cause of the failure (e.g., stuck open or stuck closed) based on the measured fluid pressure after pulsing the actuator 115.

The control module 125 may be further configured to take remedial action if it is determined that the actuator 115 has failed. Remedial action may include illuminating an indicator light on a vehicle dashboard to alert the driver to service the vehicle. Additionally, the remedial action may depend upon the function of the hydraulic device 105. For instance, if the hydraulic device 105 is a clutch assembly and the actuator 115 is stuck in the open position, the control module 125 may be configured to treat the hydraulic device 105 as a shaft instead of a clutch assembly. Of course, the control module 125 may be configured to take other remedial actions.

In general, computing systems and/or devices, such as the control module 125, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
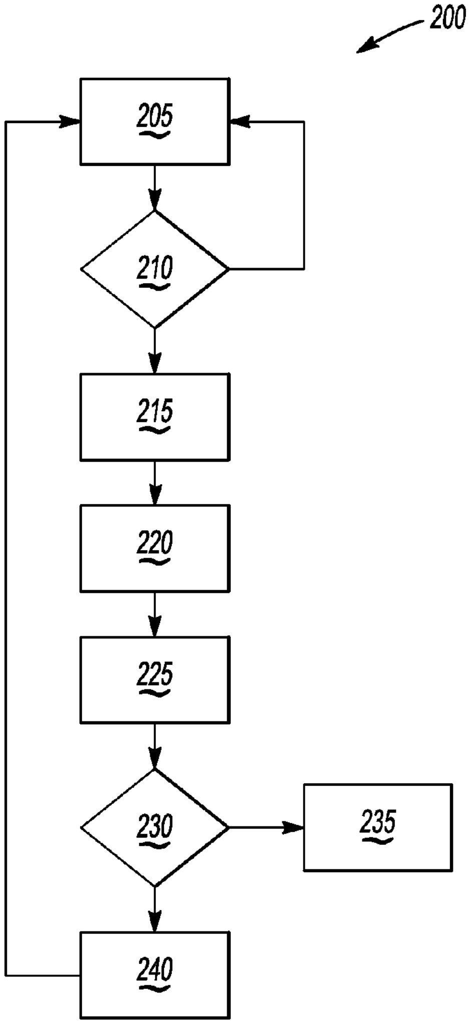
FIG. 2 is a flowchart of an exemplary process implemented by the system of FIG. 1.

FIG. 2 illustrates an exemplary process 200 that may be implemented by the system of FIG. 1.

At block 205, the system 100 measures a first fluid pressure in the hydraulic device 105. For example, the sensor 120 may be configured to measure the first fluid pressure in the hydraulic device 105 and output a first pressure signal representative of the first measured fluid pressure to the control module 125.

At decision block 210, the system 100 determines whether the fault pending condition exists based on the first measured fluid pressure. For instance, the control module 125 may be configured to compare the first measured fluid pressure to an expected fluid pressure, and determine that the fault pending condition exists if the first measured fluid pressure is substantially different than the expected fluid pressure. If the first measured fluid pressure is substantially the same as the expected fluid pressure, the process 200 may return to block 205. However, if the first measured fluid pressure and the expected fluid pressure are substantially different, the process 200 may continue with block 215.

At block 215, the fluid pressure to the hydraulic device 105 is measured. For instance, the control module 125 may increase the fluid pressure by commanding the pump 110 to output the fluid at a higher pressure via the pump control signal. As previously discussed, the operating range of the hydraulic device 105 may be different than the operating range of the sensor 120. This means that the difference between the first measured fluid pressure and the expected fluid pressure may be because the fluid pressure is below the threshold level required for the sensor 120 to operate properly. Therefore, the control module 125 may boost the fluid pressure in the hydraulic device 105 to a pressure above the minimum threshold level that the sensor 120 is able to measure. Moreover, in one exemplary implementation, the control module 125 may be configured to maintain this increased fluid pressure for the remainder of the fault pending condition to eliminate the sensor 120 as a cause of the fault pending condition.

At block 220, the system 100 iteratively enables and disables the actuator 115 at least partially during the fault pending condition. As discussed above, the actuator 115 regulates fluid flow to the hydraulic device 105. In particular, the actuator 115 allows fluid to flow to the hydraulic device 105 when the actuator 115 is enabled and prevents fluid from flowing to the hydraulic device 105 when the actuator 115 is disabled. If the fault pending condition was caused by debris becoming stuck in the actuator 115, iteratively enabling and disabling the actuator 115 may cause the debris to become loose, remedying the fault pending condition.

At block 225, a second fluid pressure in the hydraulic device 105 is measured. The sensor 120 may be used to measure the second fluid pressure and output a second measured fluid pressure signal representing the second fluid pressure to the control module 125. In one exemplary approach, the sensor 120 may measure the second fluid pressure while the actuator 115 is being pulsed at block 220. Doing so may provide an indication to the control module 125 whether the actuator 115 is responding correctly. In particular, while the actuator 115 is being pulsed, the fluid pressure should periodically rise and fall. Therefore, the control module 125 may monitor the second pressure signal until it indicates that the second measured fluid pressure is rising and falling in accordance with the pulsing of the actuator 115. Alternatively, the second fluid pressure may be measured by the sensor 120 after the control module 125 has finished pulsing the actuator 115.

At decision block 230, the system 100 determines whether the actuator 115 has failed based on the second measured fluid pressure. For instance, the control module 125 may compare the second measured fluid pressure to the expected pressure. If the control module 125 determines that the second measured fluid pressure is substantially different than the expected fluid pressure, the control module 125 may take remedial action as indicated at block 235. The remedial action may include illuminating an indicator on a vehicle dashboard suggesting that the driver have the vehicle serviced. Additionally, the remedial action may be dependent upon the function of the hydraulic device 105. For instance, if the hydraulic device 105 includes a clutch assembly and the actuator 115 becomes stuck in the open position, the control module 125 may treat the hydraulic device 105 as a shaft instead of a clutch assembly.

If, on the other hand, the control module 125 determines that the second measured fluid pressure is substantially the same as the expected fluid pressure, the process 200 may continue with block 240. Block 240 includes reducing the pressure to, for example, the minimum pressure needed by the hydraulic device 105 or the pressure provided to the hydraulic device 105 prior to determining that the fault pending condition existed. In one exemplary approach, the pressure is reduced only after the fault pending condition is over. After block 240, the process 200 may end or return to block 205.

While the best modes for carrying out the invention have been described in detail, those familiar with the art to which this invention relates will recognize various alternative designs and embodiments for practicing the invention within the scope of the appended claims.

The invention claimed is:

1. A system comprising:

a hydraulic device configured to operate with a fluid at a fluid pressure;

a sensor configured to correctly measure the fluid pressure above a threshold level in the hydraulic device, the threshold level being a minimum of a predetermined operating range of the sensor;

a pump configured to provide the hydraulic device with the fluid;

an actuator configured to regulate fluid flow from the pump to the hydraulic device;

wherein the sensor is configured to measure a first fluid pressure in the hydraulic device;

a control module configured to determine whether a fault pending condition exists based on the first fluid pressure, including determining that the fault pending condition exists if the first fluid pressure is different than an expected fluid pressure;

wherein the control module is configured to determine whether the actuator or the sensor caused the fault pending condition;

wherein the control module is configured to iteratively enable and disable the actuator during the fault pending condition;

wherein the sensor is configured to measure a second fluid pressure in the hydraulic device after enabling and disabling the actuator, the first fluid pressure being below the threshold level and the second fluid pressure being above the threshold level; and wherein the control module is configured to determine that the sensor caused the fault pending condition if the second fluid pressure fluctuates between a relatively higher pressure and a relatively lower pressure and the actuator caused the fault pending condition if the second fluid pressure is relatively even.

2. A system as set forth in claim 1, wherein the control module is configured to generate an actuator control signal, and wherein the actuator is configured to regulate the fluid flow to the hydraulic device based on the actuator control signal.

3. A system as set forth in claim 1, wherein the control module is configured to take remedial action after identifying that the actuator has failed.

4. A system as set forth in claim 1, wherein the actuator is configured to allow the fluid to flow to the hydraulic device when the actuator is enabled.

5. A system as set forth in claim 1, wherein the actuator is configured to prevent the fluid flow to the hydraulic device when the actuator is disabled.

6. A method comprising:

measuring a first fluid pressure in a hydraulic device with a sensor, wherein the sensor is configured to correctly measure a fluid pressure above a threshold level;

wherein the threshold level is a minimum of a predetermined operating range of the sensor;

determining via a control module whether a fault pending condition exists based on the first fluid pressure, including determining that the fault pending condition exists if the first fluid pressure is different than an expected fluid pressure;

iteratively enabling and disabling an actuator that regulates fluid flow to the hydraulic device at least partially during the fault pending condition;

determining whether the actuator or the sensor caused the fault pending condition;

measuring a second fluid pressure in the hydraulic device with the sensor after enabling and disabling the actuator, wherein the first fluid pressure is below the threshold level and the second fluid pressure is above the threshold level;

determining that the sensor caused the fault pending condition if the second fluid pressure fluctuates between a relatively higher pressure and a relatively lower pressure; and determining that the actuator caused the fault pending condition if the second fluid pressure is relatively even.

7. A method as set forth in claim 6, further comprising increasing the fluid pressure to the hydraulic device during the fault pending condition.

8. A method as set forth in claim 7, further comprising decreasing the fluid pressure to the hydraulic device after the fault pending condition is over.

* * * * *